(12) United States Patent
Jerrell et al.

(10) Patent No.: US 9,069,628 B2
(45) Date of Patent: Jun. 30, 2015

(54) SPOOLING SYSTEM CALL DATA TO FACILITATE DATA TRANSFORMATION

(71) Applicant: International Business Machines Corporation, Armonk, NY (US)

(72) Inventors: Richard Ory Jerrell, Manchester, NH (US); Ury Segal, Vancouver (CA); Galia Diamant, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/860,000

(22) Filed: Apr. 10, 2013

(65) Prior Publication Data

US 2014/0310727 A1    Oct. 16, 2014

(51) Int. Cl.
 *G06F 3/00* (2006.01)
 *G06F 9/44* (2006.01)
 *G06F 9/46* (2006.01)
 *G06F 13/00* (2006.01)
 *G06F 9/54* (2006.01)

(52) U.S. Cl.
 CPC ..................... *G06F 9/541* (2013.01)

(58) Field of Classification Search
 CPC ....................................................... G06F 9/541
 USPC ........................................................ 719/328
 See application file for complete search history.

(56) References Cited

U.S. PATENT DOCUMENTS

| | | | |
|---|---|---|---|
| 6,006,214 A | 12/1999 | Carey et al. | |
| 6,732,211 B1 * | 5/2004 | Goyal et al. | 710/261 |
| 7,426,512 B1 | 9/2008 | Ben-Natan | |
| 7,437,362 B1 | 10/2008 | Ben-Natan | |
| 7,506,371 B1 | 3/2009 | Ben-Natan | |
| 7,748,027 B2 * | 6/2010 | Patrick | 726/2 |
| 2007/0130616 A1 | 6/2007 | Ng et al. | |
| 2008/0250400 A1 | 10/2008 | Vertes | |
| 2010/0030737 A1 * | 2/2010 | Scheuber-Heinz et al. | 707/3 |
| 2010/0128866 A1 | 5/2010 | Irun-Briz et al. | |
| 2010/0241844 A1 | 9/2010 | Hussain et al. | |
| 2011/0276987 A1 | 11/2011 | Pope et al. | |

* cited by examiner

*Primary Examiner* — Timothy A Mudrick
(74) *Attorney, Agent, or Firm* — Jeffrey S. LaBaw; David H. Judson

(57) ABSTRACT

The techniques herein provide for "time-shifting" of intercepted system calls to enable a one-to-many (1:n) or a many-to-one (n:1) mapping of intercepted-to-real system calls. Any action that needs to be applied on the logical boundaries of the data (instead of the physical boundaries) presented upon system call interception spools (buffers) the data before taking the action and then unspools the result when finished. The action may be quite varied, e.g., examining the data, redacting the data, changing the data, restricting the data, processing the data, and updating the data, among others. The technique may be implemented in a database access control system.

20 Claims, 5 Drawing Sheets

SPOOLING SYSTEM CALL DATA TO FACILITATE DATA TRANSFORMATION

BACKGROUND OF THE INVENTION

1. Technical Field

This disclosure relates generally to securing resources in a distributed computing environment, such as a transaction processing environment.

2. Background of the Related Art

In a computing environment, a "system call" is a mechanism by which a program or process requests a service from an operating system's kernel. In a typical operating system (OS), such as Linux, the operating system segregates virtual memory into kernel space and user space, the former being reserved for running the OS kernel, kernel extensions, and device drivers, the latter being where all user mode applications work. System calls provide the interface between programs or processes executing in user space and the operating system kernel executing in kernel space.

For security reasons, it can be beneficial to analyze and modify data that is read or written by a program. If filtering or redaction (or, more generally, some other transformation) is required, then the data flowing through the system needs to be intercepted and acted upon. When system calls are intercepted, this data can be sent out for analysis and even modified according to pre-configured rules. When redaction is required, the most simplistic approach is to apply the redaction inside a one-to-one (1:1) mapping of intercepted to real system calls. Several existing commercial products perform this function.

Often, however, a single transaction's data can be split across multiple system calls. When intercepting system calls, e.g., for the purpose of applying transformations on the data sent and received through the operating system, there is no guarantee that the amount of data intercepted encompasses the entire logical packet. For example, consider a MySQL database that is receiving TCP packets. The packets are received in two parts; first, the header is received, and then the packet body. Typically, the packet header is received first and indicates a number of bytes in the following packet. Now, suppose it is desired to redact queries to a database to restrict the results to a particular column (e.g., a SQL statement such as 'where EMPLOYEE=20'). To do this, the database query is modified to fit the additional clause. In a 1:1 mapping of intercepted-to-real system calls, however, the header will have already passed to the database, and thus it will be too late to change the size of the packet. More generally, a single query (e.g., to read from the database) could be split up across multiple system calls. Irrespective of the nature of the query or the function required, once the data read or written in the system call is returned to the user process, it is too late to modify it. This limitation has prevented existing solutions from rewriting or redacting intercepted data that spans more than a single system call.

BRIEF SUMMARY

The techniques herein provide for "time-shifting" of intercepted system calls to enable a one-to-many (1:n) or a many-to-one (n:1) mapping of intercepted-to-real system calls. Any action that needs to be applied on the logical boundaries of the data (instead of the physical boundaries) presented upon system call interception spools (buffers) the data before taking the action and then unspools the result when finished. The action may be quite varied, e.g., examining the data, redacting the data, changing the data, restricting the data, processing the data, and updating the data, among others.

The approach as described herein assumes that a system call has an associated source, and a destination. In the case of a "read," the source is the original system call itself, and the destination is user space. In the case of a "write," the source is user space, and the destination is the original system call. According to this disclosure, in effect a "hold" is put on the data associated with a system call. In particular, and in the case of a read, the hold spools the data and does not return to user space before all the data has been read. In the case of a write, the hold spools the data until all data that is going to be written is read from user space. The holding the data in this manner enables application of a transformation to be done transparently to the user processes calling the intercepted system calls. In addition, use of this approach enables the processing of the data and application of the transformation to be done remotely, e.g., to avoid memory restrictions and so that different sets of data can be correlated with one another.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
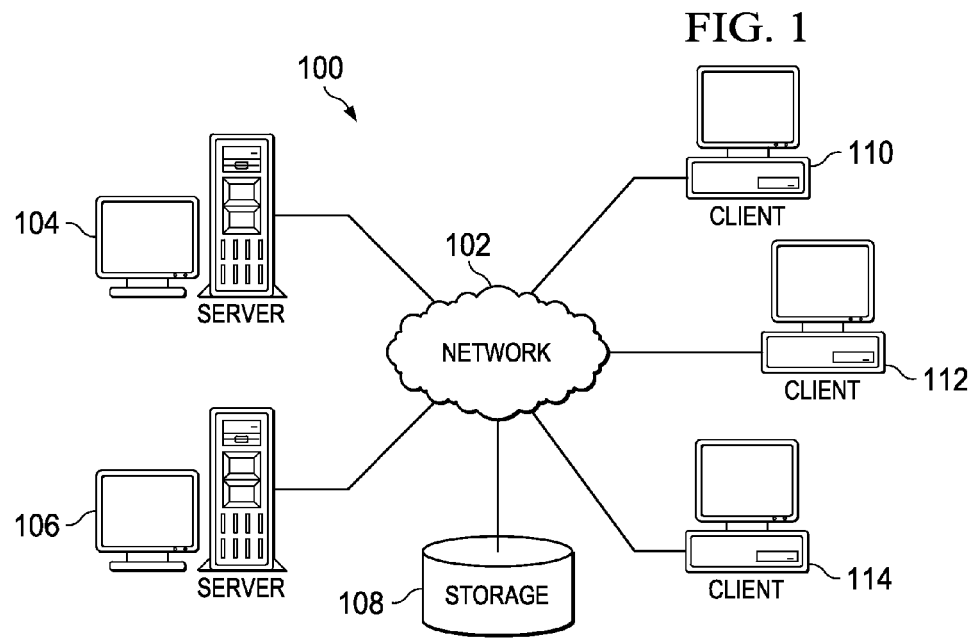
FIG. 1 depicts an exemplary block diagram of a distributed data processing environment in which exemplary aspects of the illustrative embodiments may be implemented.
Figure 2:
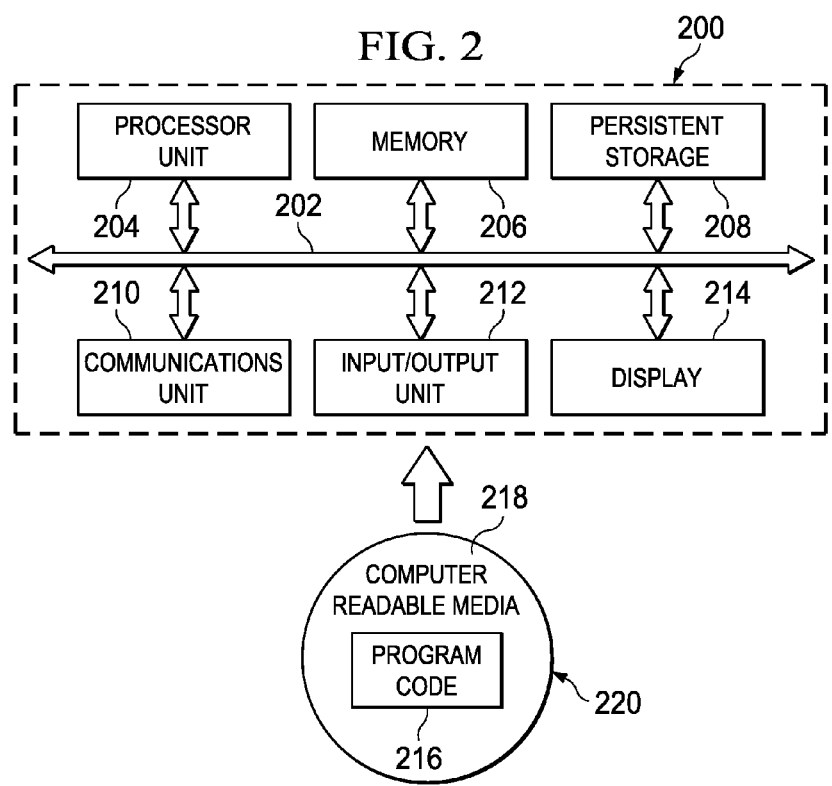
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Although not intended to be limiting, the techniques of this disclosure (described in more detail below) may be implemented in a known database access control system (LDACS) architecture. An LDACS also facilitates auditing and logging operations with respect to a database that is accessible over a network. In this approach, typically an inter-process communication (IPC) intercept is defined to identify an access point common to local and remote database (DB) access attempts. Local access attempts to the database are intercepted and transported to a data security device operable for network monitoring of the access attempts. Because the data security device is remote, it is sometimes referred to as an "external security device" (or "ESD"). The IPC intercept performs interception of the local access attempts through a minimal footprint implementation object to mitigate resource overhead. In this manner, the remote network data security device observes both the local access attempts via interception at the DB host and transmission of the intercepted access attempts to the data security device, and the remote access attempts via the network, thereby consolidating analysis and logging of the data access attempts to the database resource via the data security device.

Figure 3:
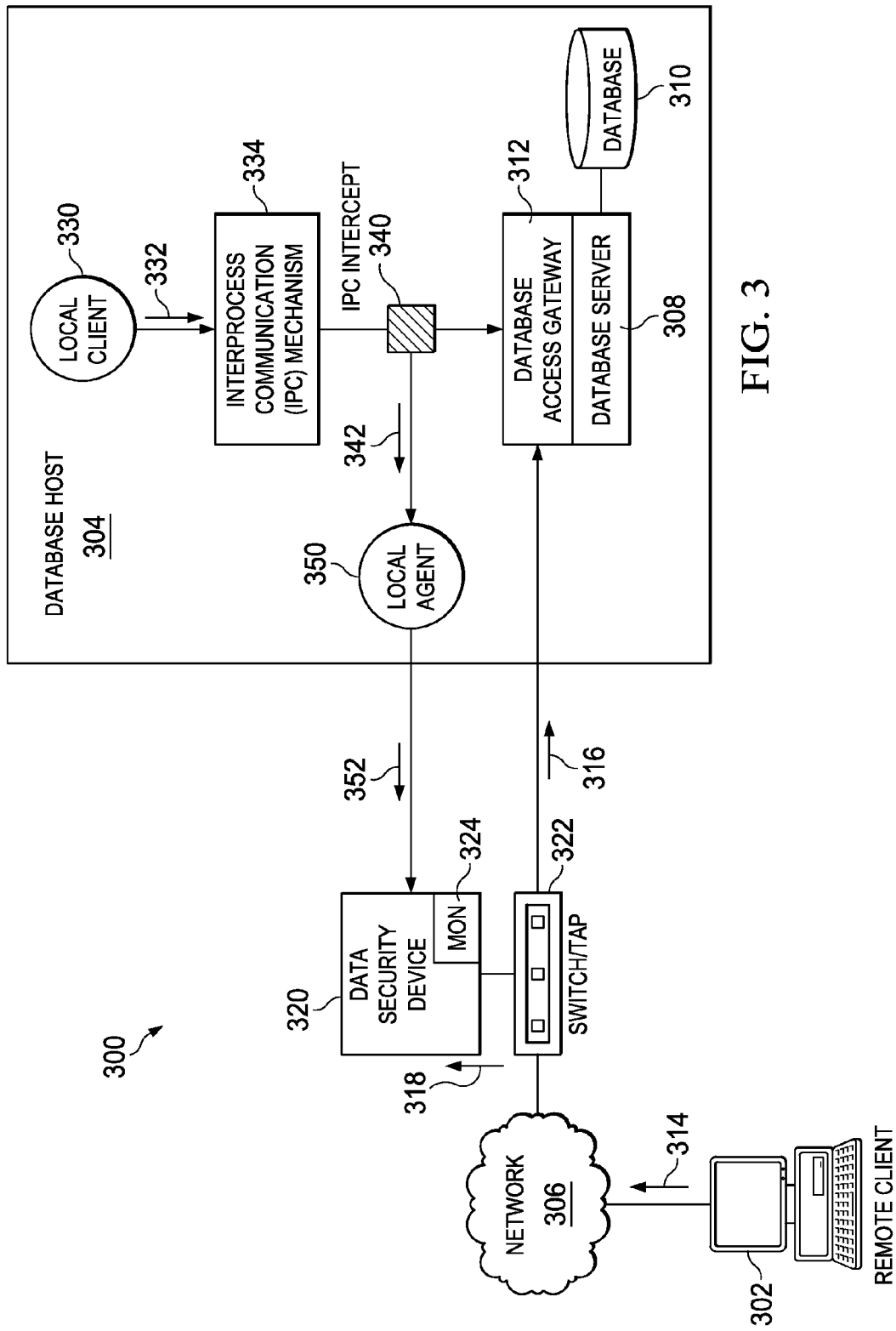
FIG. 3 depicts the high level operation of a known Local Database Access Control System (LDACS) in which the techniques of this disclosure may be practiced in a non-limiting embodiment.

FIG. 3 illustrates the architecture and operation of an LCADS in which the techniques of this disclosure may be practiced. Referring to FIG. 3, the environment 300 provides a remote user 302 with a database (DB) host 304 for data storage and retrieval operations (DB operations). The user 302 connects to the host 304 via an access network 306, which may be any suitable internetworking infrastructure such as a LAN, intranet, extranet or the Internet. The DB host 304 includes a database server 308 connected to the database 310, typically a disk array or set of mass storage devices such as disk drives. The database 308 includes a DB access gateway 312, which operates as an application programming interface (API) for user 302 access via a variety of access methods.

A user initiates access to the database in the form of a user request 314, which passes through the network 306 for delivery to the DB access gateway 312 as an incoming request 316. A data security device 320 is connected via a switch e22 or other connectivity device such as a tap, router or bridge, on the path from the network 306 to the host 304. The data security device 320 includes a DB monitor 324 for receiving user requests 314 sent through the switch 322. The DB monitor receives and analyzes the incoming user request 314 as a tapped access attempt 318, which the DB monitor 324 analyzes according to a predetermined security or access policy. The data security device 320 then passes the tapped access attempt 318 to the access gateway (AG) 312 as an incoming request 116.

Typically, the database server 308 expects a substantial portion of DB traffic (user requests 314) to arrive remotely via the network 306, and thus pass scrutiny under the data security device 320. However, a portion of database access attempts emanate locally from a local client 330, executing on the host 304, as local access attempts 332. The local access attempts 332 arrive at the access gateway 312 via an Inter-Process Communication (IPC) mechanism 334. Such local access attempts 332 do not pass through the switch 322, and therefore may otherwise be operable to elude scrutiny of the data security device 320. To address this concern, a known LDACS solution employs an IPC intercept 340 for intercepting the local access attempt 332 and transporting the intercepted access attempt 342 to a local agent 350. The local agent 350 determines, by interrogating the IPC mechanism 334, a database instruction 352 corresponding to the local access attempts 332. The local agent 350 then transmits the determined database instruction 352 to the data security device 320 for analysis and further operations by the DB monitor 324. In this manner, the data security device 320 receives all local and remote access attempts to the DB server 308 to more fully analyze, monitor, and guard against access attempts that may be undesirable. Although the above-described configuration is preferred, the agent 350 need not be local, but rather may be positioned in other locations or configurations associated with a database host or system.

In a typical DB host 304, the local client 330 may employ a variety of IPC mechanisms 334 to transmit local access attempt 332 to the DB server 308. IPC typically is not secure. Alternate configurations may employ other communication mechanisms, such as cryptographic remote method invocation.

As noted above, the description of LCADS is not intended to be limiting. The techniques that are now described may be implemented in other types of solutions, e.g., auditing and compliance systems, change control solutions, vulnerability management solutions, fraud prevention solutions, database leak prevention solutions, and others.

More generally, the techniques described herein may be implemented in any computing environment wherein a program or process requests a service (e.g., a read, a write, or the like) from an operating system's kernel, e.g., using a system call, and some action needs to be applied on the logical boundaries of the data associated with the service.

Spooling System Call Data

Figure 4:
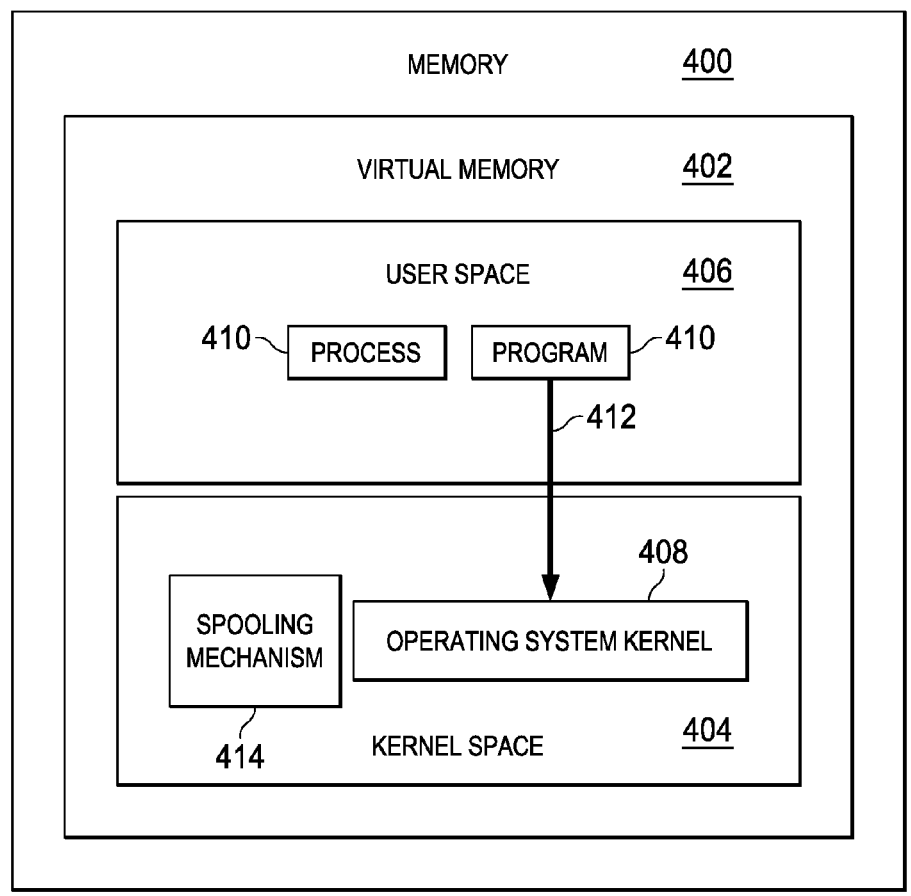
FIG. 4 illustrates a memory of a computing entity and in which a spooling mechanism functionality of this disclosure may be implemented.

FIG. 4 illustrates the system memory architecture of a representative computing entity in which the techniques herein may be implemented. The computing entity may be of the type described above with respect to FIG. 2. It includes a processor (not shown), and a memory 400 that is organized to include a virtual memory 402 that in turn is segregated into a kernel space 404 and a user space 406. Kernel space supports an operating system kernel 408. Processes or programs 410 execute in user space 406. System calls, such as system call 412, provide the interface between the programs or processes 410 executing in user space 406 and the operating system kernel 408 executing in kernel space 404.

According to this disclosure, a mechanism 414 is provided for spooling system call data, e.g., for data transformation such as analysis and redaction. The spooling mechanism 414 provides for "time-shifting" of intercepted system calls to enable a one-to-many (1:n) or a many-to-one (n:1) mapping of intercepted-to-real system calls. In this approach, any action that needs to be applied on the logical boundaries of the data (instead of the physical boundaries) presented upon system call interception spools (buffers) the data before taking the action and then unspools the result when finished. The action may be quite varied, e.g., examining the data, redacting the data, changing the data, restricting the data, processing the data, and updating the data, among others, and it may be performed locally or remotely. An example embodiment of the remote processing approach is that described above with respect to FIG. 3.

As described, the approach assumes that a system call 414 has an associated source, and a destination. In the case of a "read," the source is the original system call itself, and the destination is user space 406. In the case of a "write," the source is user space, and the destination is the original system call. The spooling mechanism 414 operates to place a "hold" on the data associated with a system call 412. In particular, and in the case of a read, the spooling mechanism 414 spools the data and does not return to user space before all the data has been read. In the case of a write, the spooling mechanism 414 spools the data until all data that is going to be written is read from user space 406. The holding the data in this manner enables application of a transformation to be done transparently to the user processes 410 calling the intercepted system calls. In addition, use of this approach enables the processing of the data and application of the transformation to be done remotely, e.g., to avoid memory restrictions and so that different sets of data can be correlated with one another.

The spooling mechanism 414 operates by hooking a system call. The mechanism includes an analyzer function, as will be described below in more detail. When a system call 412 is hooked, the address of the spooling mechanism function is inserted in place of the address of the original function, and that address (of the original function) is saved by the operating system. Then, when it is necessary to then call (return to) the original system call, the address of the original system call that was saved during the hooking process is then used. For purposes of explanation, one or more data constructs or structures are maintained and processed by the spooling mechanism as the time shifting approach of this disclosure is carried out. These data structures are sometimes referred to as "buffers." Thus, as used herein, an "original buffer" refers to the data originally passing through the operating system kernel 408 and that is discovered via one or more system calls. There may be multiple original buffers. This data is considered to pass through because, in the read sense, and from the perspective of the system call hook, the data originates from the kernel's original system call, whereas, in the write sense, the data originates from the user. A "changed data buffer" refers to the data from the original buffer or buffer(s) after it has had a transformation applied. A "remainder counter" refers to an amount of data left in the original buffer that still needs to be transferred, whether to the original system call (for a read) or to the user (for a write). The term "spooling" means buffering. Thus, in operation of the spooling mechanism, data (the original buffers) is collected, concatenated together (into a working buffer), the transformation is applied, and the result stored into the changed data buffer, and the changed data buffer is then drained back (or "unspooled") to wherever the original buffers were intended to go (namely, the original system call for a read, or the user for a write).

In an intercepted system call, the data of interest is the data associated with the call. For a read system call (e.g., recv, read, or the like), the data is available only after the original system call is called. For a write system call (e.g., send, write, or the like), the data is passed in as an argument. In both cases, there is no way to control the size of the buffer provided to the system call. Because of the different ways in which this data exists, the read and write system calls must be processed differently, although the general concept is similar. In particular, the application of the spooling/unspooling method is very similar in both cases, primarily differing in where the (1:n) mapping (of intercepted system calls to actual system calls) occurs. In the read system call case, the entire logical packet of data (e.g. a database query) needs to be collecting (before returning any data to the user) so that any transformation can be applied. In particular, the user process calling the system call has provided a buffer to be filled with data. Because there is a need to apply a transformation to that data before the user process receives it, the read data is held until the transformation can be applied. Because there is no guarantee that the entire logical packet of data will fit within the provided buffer (nor that the transformed data will fit, either), according to this disclosure the data is saved until the entire packet of original data is received, the data sent out for analysis and modification (or other transformation), and the transformed data drained (unspooled) back to the user. To this end, and as will be described in FIG. 5, this is accomplished by repeatedly calling the original system call within the intercepted system call until an analyzer function (within the spooling mechanism) has detected that the packet is complete. Then, the transformation is applied (e.g., by the analyzer) and the changed data is returned back to the intercepted system call. The provided buffer is filled with the transformed data and is returned to the user. If the entire transformed packet cannot fit inside the provided buffer, then the buffer is filled to capacity and subsequent system calls by the user process will not call the original system call again, instead simply filling the provided buffers with more data from the transformed packet until the entirety of the packet has been returned, at which point the cycle begins again.

Figure 5:
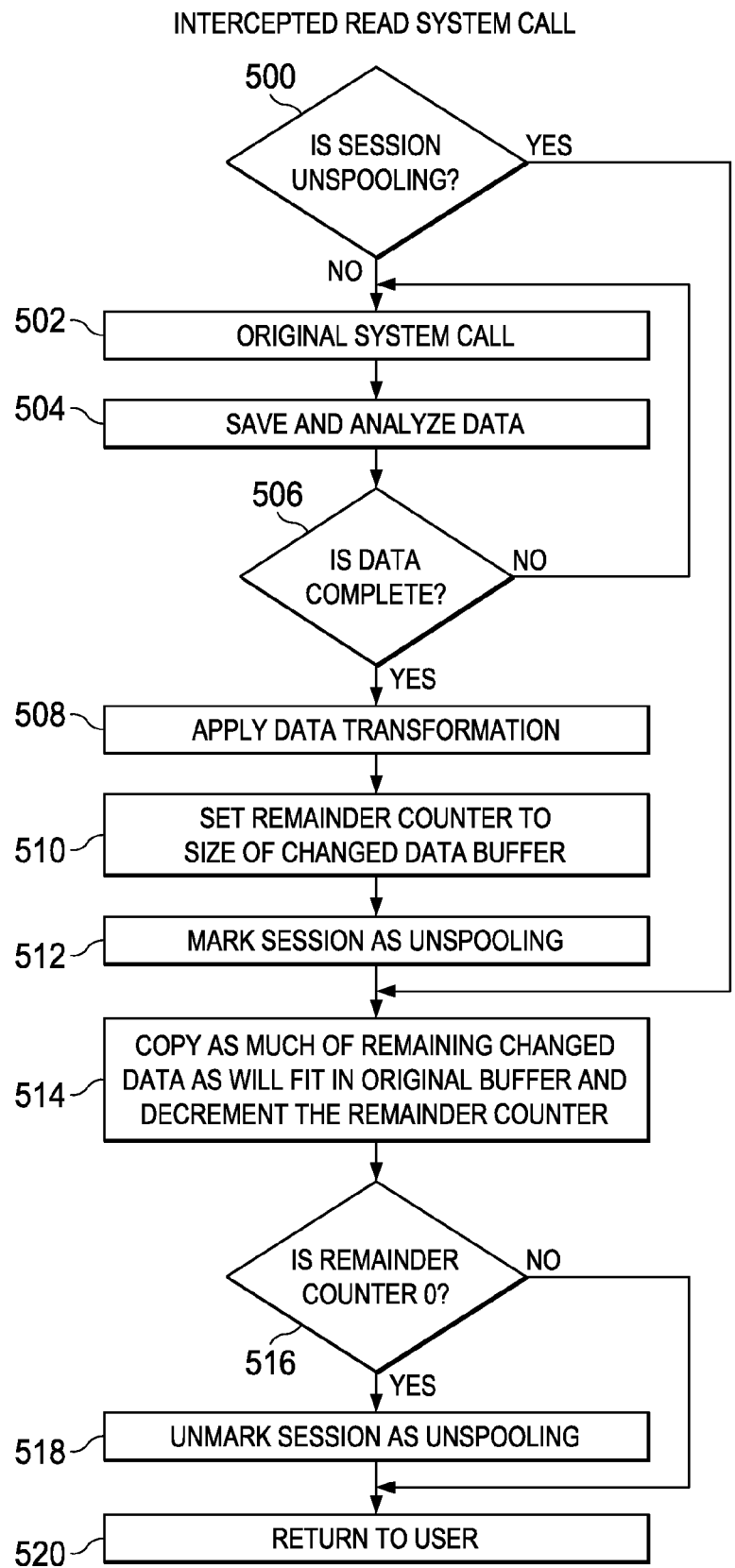
FIG. 5 illustrates a process flow for processing a first type (e.g., "read") of system call according to this disclosure.

FIG. 5 illustrates this process in detail for the intercepted read system case upon interception. The routine begins at step 500 by testing whether a session is unspooling. If the outcome of the test at step 500 is negative, the routine continues by analyzing the original system call at step 502. At step 504, data in the original system call is saved. A test is then executed at step 506 to determine if the data is complete. If the outcome of the test at step 506 is negative, this portion of the routine cycles back to step 502 to obtain additional data from the original system call. If, however, the outcome of the test at step 506 is positive, which indicates all the data is complete, the routine continues at step 508 to apply a data transformation. The nature of the transformation may be quite varied, e.g., examining, redacting, changing, restricting, processing, updating, and the like. There is no restriction on the nature and scope of the transformation, which is a known function/operation. After the transformation is applied, the routine continues at step 510 to set a remainder counter to the size of a changed data buffer. The routine then continues at step 512 to mark the session as unspooling. Control then continues at step 514, which step is also reached if the outcome of the test at step 500 is positive. At step 514, as much of the remaining changed data as will fit in the original buffer is copied, and the remainder counter is decremented. A test is then performed at step 516 to determine whether the remainder counter is zero. If so, the session is unmarked as unspooling in step 518. The routine then continues at step 520 to return to the user, and this step is also reached upon a negative outcome to the test at step 516. This completes the processing of the intercept read system call case.

In the write system call case, the entire logical packet of data needs to be collected before calling the original system call so that a transformation can be applied. In this context, the user process calling the system call has provided a buffer with data to be sent. Because there is a need to apply a transformation to that data before it is transferred, all of the original packet data needs to be collected together before the transformation can be applied. As noted above, it is possible that the packet is split across multiple system calls. It is also possible that, after the transformation is applied, the new packet will not fit in the buffer provided by the user process. As such, until the analyzer determines that an entire packet has been received, the mechanism collects the data from the user process and returns from the intercepted system call as if the data was transferred successfully. The analyzer then applies the transformation and sends the modified data back to the original system call (which is the call from the user process that sent the last portion of the original packet). If the new packet does not fit inside the buffer provided by the calling process, then the system call is called, repeatedly as necessary, without returning to the user until the last part of the transformed packet has been sent.

Figure 6:
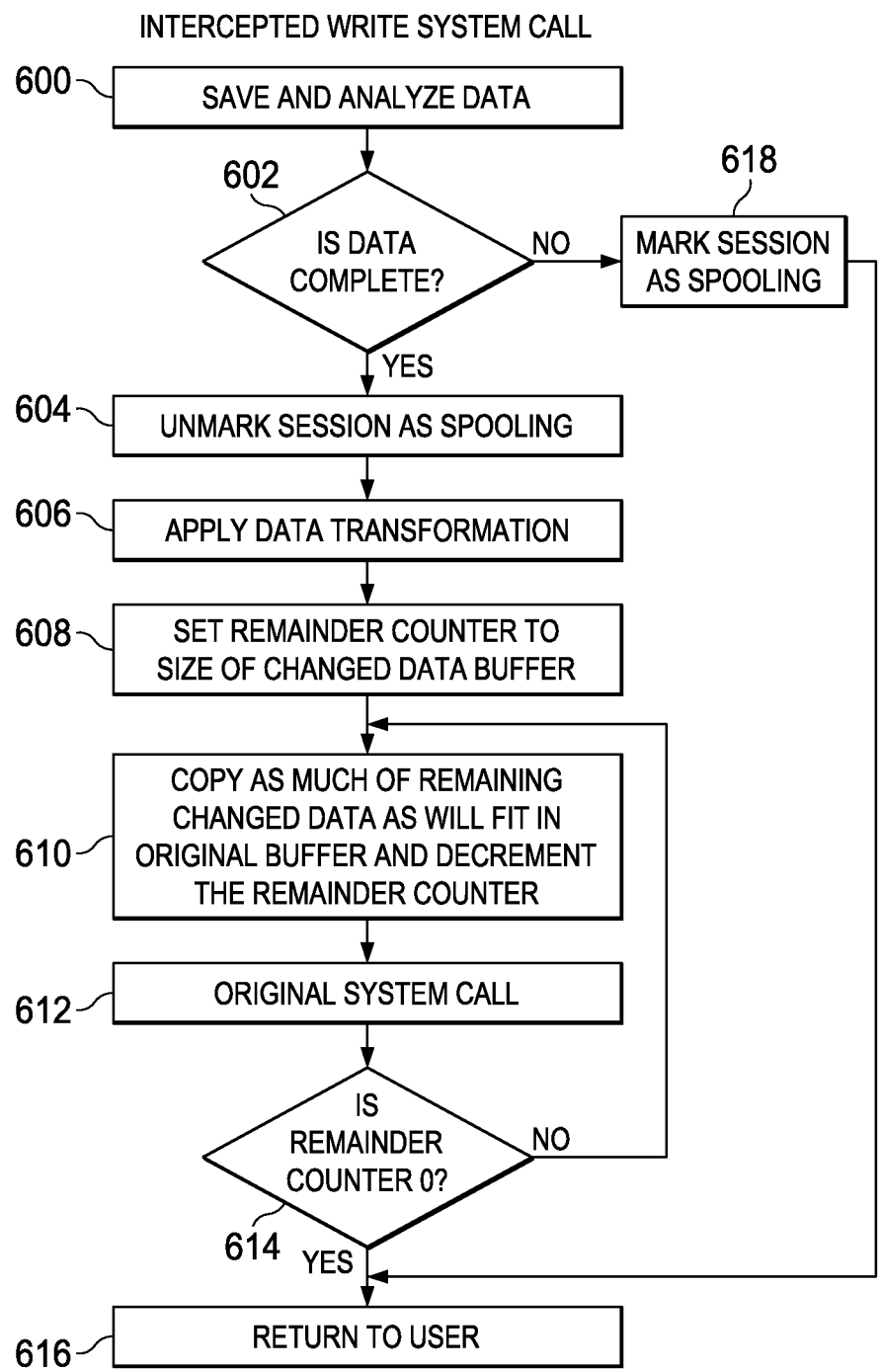
FIG. 6 illustrates a process flow for processing a second type (e.g., "write") of system call according to this disclosure.

FIG. 6 illustrates the detailed process flow for the write system call case upon interception. The routine begins at step 600 by saving and analyzing data. At step 602, a test is performed to determine whether the data is complete. If the outcome of the test at step 602 is positive (data is complete), the routine continues at step 604 to unmark the session as spooling. The routine then continues at step 606 to apply a data transformation, as described above. At step 608, the remainder counter is set to a size of the changed data buffer. The routine then continues at step 610 with as much of the remaining changed data as will fit in the original buffer being copied, and the remainder counter being decremented. After step 610, the routine returns to the original system call. This is step 612. A test is then performed at step 614 to determine if the remainder counter is zero. If not, control returns back to step 610. If, however, the remainder counter is zero, the control returns to the user at 616. Step 616 is also reached if the outcome of the test at step 602 is negative, in which case the session is marked as spooling in step 618 and the return to user implemented. This completes the processing of the intercept write system call case.

Stated another way, in the read case there is an (1:n) mapping of intercepted-to-real system calls, wherein the single intercepted system call translates to multiple dispatched calls until the complete data set is retrieved and then is returned back (across m number of intercepted calls) with no corresponding dispatched system call. In the write case, there is an (n:1) mapping of intercepted-to-real system calls, wherein n−1 intercepted calls have no corresponding dispatched call and the $n^{th}$ intercepted call contains a final portion of the data set such that m number of dispatched calls are performed before the last intercepted call returns. Once the data is spooled, any transformation may be applied (including no transformation). As an example, assume a simple case of a SQL-based database query "select * from employee where dept=20". If the data presented to the system call is split into two buffers containing the strings "select * from employee" and "where dept=20", those two string are really part of the same query; assume further that the transformation includes a rule that says "Replace 'dept=20' with 'dept=21' when object='employee'". Another possible transformation might be "Drop a session when attempting to access object 'employee' from dept. '20'". Using the approach herein, these types of transformations can be applied to the data provided by the user application without the breaks inserted by the delivery protocol or other application restrictions.

Thus, as has been described, the spooling mechanism is a time-shifting device for intercepted system calls, with an optional modification to the original data sent and received. As described in the statement of the problem, when intercepting system calls for the purpose of applying transformations on the data sent and received through the operating system, there is no guarantee that the amount of data intercepted encompasses the entire logical packet. For example, when intercepting TCP traffic for a database, a single query could be split up across multiple calls to read. According to the approach of this disclosure, and instead of performing a 1:1 mapping of intercepted-to-real system calls, during a read the data intercepted is analyzed and the original system call is re-called as necessary until all data is read; then, a transformation can be applied by operating on that completed set and then returned to the original caller by refilling the original buffer, potentially across multiple system calls. This enables the application of the transformation to be done transparently to the user processes calling the intercepted system calls.

In addition, the processing of the data and application of the transformation can be done remotely to avoid memory restrictions and so that different sets of data can be correlated with each other. This approach may be used in the LDACS solution in FIG. 3. Thus, for example, one application of this data correlation is protection of a host database against unauthorized access. The transformation is used to protect data elements that would otherwise be difficult or impossible to secure using standard access controls. For example, by correlating the data, a user's entire session with the database could be watched by following it from open to close. This authorized user may require access to tables that contain data subsets that they are not authorized to view or modify. By transforming the queries, the protected data can be secured automatically (e.g., instead of 'select * from table', 'select * from table where . . . '). As is well-known, however, the correlation and transformation steps are complicated and require keeping a history of what has happened during a session. This is too complicated to insert in-line to the intercepted system call, thus, the LDACS solution enables the provision of a separate collector/analyzer for processing the data and relaying that information back to the system call. Because this process needs to be transparent to the user, the technique of this disclosure is then used to "pause" the original system call(s) until the processing is completed.

The mechanism described here is useful for more than redaction of database queries. This could be useful for firewalling data based on the contents of the data, selective auditing, or the like. More generally, the approach may be used to facilitate any transform that needs to be applied on the logical boundaries of the data (instead of the physical boundaries) presented with system call interception and wherein there is a need to spool the data before applying the transformation (and then to unspool the result when finished).

The technique herein provides many advantages. By creating the one-to-many (multiplexed) mapping of intercepted to real system calls, transformations can be applied more effectively, even though the intercepted data would otherwise span more than a single system call. In the 1:n mapping (the read case), the real system call is re-called as many times as may be necessary before returning to user space. In particular, the technique reads until the entire packet is collected, the transformation is then applied, and the modified data (including a modified packet header) is then returned to user space.

The spooling mechanism functionality described above may be implemented as a kernel modification, as a standalone approach, or some combination thereof. In either case, the transformation may be implemented as a software-based function executed by a processor, or it may be available as a managed service (including as a web service via a SOAP/XML interface). The particular hardware and software implementation details described herein are merely for illustrative purposes are not meant to limit the scope of the described subject matter.

Without limiting the foregoing, a representative LDACS solution in which the approach may be used is IBM® InfoSphere® Guardium Version 8.0. This solution comprises a scalable architecture and includes collector, aggregator and central management appliances, as well as software tap (S-Tap) agents installed on the database servers, and kernel tap (K-Tap) agents installed in association with the kernel. The K-Tap collects the data, and the S-Tap transports the collected data to the point at which the transformation is applied (and receives the result).

The technique described herein may be implemented with respect to other types of system calls besides reads and writes.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the spooling mechanism components are implemented in a special purpose computer, preferably in software executed by one or more processors. The software is maintained in one or more data stores or memories associated with the one or more processors, and the software may be implemented as one or more computer programs. Collectively, and in one embodiment, this special-purpose hardware and software comprises the spooling mechanism described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

Having described our invention, what we now claim is as follows.

The invention claimed is:

1. A method for processing a system call in a computing system having a memory, the system call having an associated source, and a destination, comprising:
   upon intercepting a system call, applying a function that executes in a hardware element to spool data associated with two or more real system calls until a complete set of data associated with the system call has been spooled by:
     calling each real system call within the intercepted system call;
     as each real system call returns:
       determining whether a logical boundary for the data is complete;
       when the logical boundary for the data is not yet complete, holding the data;
       when the logical boundary data is complete, applying a transformation to the complete set of data; and
   responsive to receipt of a result of applying the transformation to the complete set of data, releasing the system call by unspooling the result to the destination.

2. The method as described in claim 1 wherein the source is the system call and the destination is a user space of the memory.

3. The method as described in claim 1 wherein the source is a user space of the memory and the destination is the system call.

4. The method as described in claim 1 wherein the transformation is one of: examining, analyzing, redacting, preventing, processing and updating.

5. The method as described in claim 1 wherein the two or more real system calls causes data to be read, and the transformation is applied to the complete set of data prior to returning to an application requesting the read.

6. The method as described in claim 1 wherein the two or more real system calls causes data to be written from an application, and the transformation is applied prior to initiating a first system call write.

7. The method as described in claim 1 wherein the logical boundary is characterized by the transformation to be performed on the complete set of data.

8. Apparatus, comprising:
   a processor;
   computer memory holding computer program instructions that when executed by the processor perform operations to process a system call having an associated source, and a destination, the operations comprising:
   upon intercepting the system call, applying a function to spool data associated with two or more real system calls until a complete set of data associated with the system call has been spooled by:
     calling each real system call within the intercepted system call;
     as each real system call returns:
       determining whether a logical boundary for the data is complete;
       when the logical boundary for the data is not yet complete, holding the data;
       when the logical boundary data is complete, applying a transformation to the complete set of data; and
   responsive to receipt of a result of applying the transformation to the complete set of data, releasing the system call by unspooling the result to the destination.

9. The apparatus as described in claim 8 wherein the source is the system call and the destination is a user space of the computer memory.

10. The apparatus as described in claim 8 wherein the source is a user space of the computer memory and the destination is the system call.

11. The apparatus as described in claim 8 wherein the transformation is one of: examining, analyzing, redacting, preventing, processing and updating.

12. The apparatus as described in claim 8 wherein the two or more real system calls causes data to be read and the transformation is applied to the complete set of data prior to returning to an application requesting the read.

13. The apparatus as described in claim 8 wherein the two or more real system calls causes data to be written from an application, and the transformation is applied prior to initiating a first system call write.

14. The apparatus as described in claim 8 wherein the logical boundary is characterized by the transformation to be performed on the complete set of data.

15. A computer program product in a non-transitory computer readable medium for use in a data processing system, the computer program product holding computer program instructions which, when executed by the data processing system, perform a method for processing a system call having an associated source, and a destination, the method comprising:

upon intercepting the system call, applying a function to spool data associated with two or more real system calls until a complete set of data associated with the system call has been spooled by:

calling each real system call within the intercepted system call;

as each real system call returns:

determining whether a logical boundary for the data is complete;

when the logical boundary for the data is not yet complete, holding the data;

when the logical boundary data is complete, applying a transformation to the complete set of data; and responsive to receipt of a result of applying the transformation to the complete set of data, releasing the system call by unspooling the result to the destination.

16. The computer program product as described in claim 15 wherein the source is the system call and the destination is a user space of a memory.

17. The computer program product as described in claim 15 wherein the source is a user space of a memory and the destination is the system call.

18. The computer program product as described in claim 15 wherein the transformation is one of: examining, analyzing, redacting, preventing, processing and updating.

19. The computer program product as described in claim 15 wherein the two or more real system calls causes data to be read, and the transformation is applied to the complete set of data prior to returning to an application requesting the read.

20. The computer program product as described in claim 15 wherein the logical boundary is characterized by the transformation to be performed on the complete set of data.

* * * * *